(12) United States Patent
Gupta et al.

(10) Patent No.: US 7,007,757 B2
(45) Date of Patent: Mar. 7, 2006

(54) FRACTURING FLUIDS CONTAINING BORATE ESTERS AS CROSSLINKING AGENTS AND METHOD OF USING SAME

(75) Inventors: D. V. Satyanarayana Gupta, Tomball, TX (US); Ron Pierce, Calgary (CA); Nicole Deanne Litt, Edmonton (CA); Anita Colleen Jerat, Calgary (CA)

(73) Assignee: BJ Services Company Canada, (CA)

( * ) Notice: Subject to any disclaimer, the term of this patent is extended or adjusted under 35 U.S.C. 154(b) by 0 days.

(21) Appl. No.: 10/178,410

(22) Filed: Jun. 25, 2002

(65) Prior Publication Data

US 2003/0234105 A1    Dec. 25, 2003

(51) Int. Cl.
    E21B 43/26    (2006.01)
(52) U.S. Cl. ............... 166/308.5; 166/300; 166/305.1
(58) Field of Classification Search .............. 166/300, 166/305.1, 308, 308.1, 308.5
    See application file for complete search history.

(56) References Cited

U.S. PATENT DOCUMENTS

| | | | |
|---|---|---|---|
| 4,514,309 A * | 4/1985 | Wadhwa ..................... | 507/211 |
| 4,619,776 A | 10/1986 | Mondshine | |
| 4,766,959 A * | 8/1988 | Allison ....................... | 166/295 |
| 5,067,566 A * | 11/1991 | Dawson ...................... | 166/308 |
| 5,165,479 A | 11/1992 | Harris et al. | |
| 5,217,632 A | 6/1993 | Sharif | |
| 5,246,602 A * | 9/1993 | Forrest ...................... | 166/283 |
| 5,658,861 A * | 8/1997 | Nelson et al. .............. | 507/200 |
| 5,877,127 A * | 3/1999 | Card et al. .................. | 507/273 |
| 6,069,118 A * | 5/2000 | Hinkel et al. ............... | 507/277 |
| 6,105,691 A * | 8/2000 | Hayatdavoudi et al. ....... | 175/70 |
| 6,239,183 B1 * | 5/2001 | Farmer et al. .............. | 516/102 |
| 6,267,186 B1 * | 7/2001 | Hayatdavoudi .............. | 175/64 |
| 6,739,806 B1 * | 5/2004 | Szymanski et al. ......... | 405/267 |
| 2001/0016561 A1 * | 8/2001 | Hayatdavoudi ............. | 507/100 |
| 2002/0125012 A1 * | 9/2002 | Dawson et al. ............. | 166/300 |

OTHER PUBLICATIONS

Altunina et al., EOR Technologies:Physico-Chemical Aspects, Jun. 28, 2001, Eurasian ChemTech Hournal 3 (2001) 179-190.*

DRAFT EPA 816-D-02-006, Chapter 4, Hydraulic Fracturing Fluids, Aug. 2002, 22 pages.*

Tayal et al, "Rheology and Microstructural Changes During Enzymatic Degradation of a Guar-Borax Hydrogel" Aug. 7, 1999, ACS, Macromolecules 1999, 32, 5567-5574.*

Schlumberger "YF 100EC" Sep. 2003, 4 pages, from www.slb.com/oilfield.*

TBC-Brinadd, "Fracsal Product Description", undated, from www.tbc-brinadd.com/products/sysadd/Fracsal.html, 2 pages.*

Environmental Expert com "Solvents Database" from ChemTec Publishing, 2001, downloaded from www.environmental-expert.com/resultteachpublication.asp?codi=2802, 2 pages.*

R.J. Lewis, Hawley's Condensed Chemical Dictionary, 14th edition, John Wiley & Sons, definition of "solvent" on p. 1032, 2001.*

K.E. Cawlexel and J.L. Elbel; A New System for Controlling the Crosslinking Rate of Borate Fracturing Fluids; SPE 20077; Aug. 1992; pp. 275-279.

H.C. Tan, K.S. Wesselowski, and J.D Willingham; Delay Borate Crosslinked Fluids Minimize Pipe Friction Presure; SPE 24342; 1992; whole document.

P.E. Clark and O. Barkat; Hydraulic Fracturing Fluids: the Crosslinking of Hydroxypropyl Guar With Titanium Chelates; SPE 19331; Oct. 1969.

A.S. de Kruijf and D.R. Davies; Relation Between Chemistry and Flow Mechanics of Borate-Crosslinked Fracturing Fluids; SPE 25206; 1993; pp. 165-170.

MSDS for Trimethyl borate azeo, Morton Chemical Specialty Products, 1995.

MSDS for Trimethoxyboroxin, Callery Chemical Company, 1995.

* cited by examiner

Primary Examiner—Katherine Mitchell
(74) Attorney, Agent, or Firm—Philip C. Mendes da Costa; Bereskin & Parr

(57) ABSTRACT

A formation treating fluid comprises one or more borate esters, a liquid carrier and, one or more cross linkable polymer wherein the formation treating fluid has an alkaline pH when the formation treating fluid is positioned in a formation. The formation treating fluid is useful in high temperature operations such as hydraulic fracturing.

10 Claims, No Drawings

FRACTURING FLUIDS CONTAINING BORATE ESTERS AS CROSSLINKING AGENTS AND METHOD OF USING SAME

FIELD OF THE INVENTION

This invention relates to fluids that may be utilized in fracturing a formation. The fluid may be used in gravel packing, hydraulic fracturing and fracpacking operations.

BACKGROUND OF THE INVENTION

Fracturing fluids typically require good shear stability and low pumping pressures. Shear stability is required to ensure that the viscosity is maintained while the fluid is loaded into the borehole. Low pumping pressures are required to ensure that the fluid may be economically pumped into a borehole. If the viscosity for fracturing fluid is too high, then difficulties will be encountered in pumping the fracturing fluid into a borehole. These include premature pump failure due to excessive pumping pressures, increased shear on the fracturing fluid and difficulty in ensuring that all of a borehole is filled with the fracturing fluid.

Due to its reactivity, borate ions have been utilized in fracturing fluids. For example, as disclosed in U.S. Pat. No. 4,619,776 [Mondshine], organic polyhydroxy compounds having hydroxyl groups positioned in the cis-form on adjacent carbon atoms or on carbon atoms in a 1,3-relationship react with borates to form 5 or 6 member ring complexes. Accordingly, borate ions, when combined with polymers having the requisite hydroxyl groups in a cis-relationship, are useful thickeners for preparing fracturing fluids. Borate cross-linked systems are useful in fracturing fluids. At a pH of above 8, borate ions will complex with many compounds such as polysaccharides, guar and locust bean gum as well as polyvinyl alcohol to provide an effective thickening agent.

The temperature at the bottom of a borehole can vary. In deeper boreholes, the temperature at the bottom of the borehole can be upwards of 150° C. (300° F.). If such a borehole requires fracturing, then the fracturing fluid preferably has a stable viscosity at those temperatures. If the viscosity decreases too much, then the effectiveness of the fluid for retaining a good dispersion of proppant during the loading of the borehole, and the subsequent fracturing operation, will be detrimentally affected. Accordingly, it is preferred that fracturing fluids which are used under high temperature conditions require thermal stability, in addition to the other requirements of a fracturing fluid including shear stability and low pumping pressures.

Typically, the source of borate ions has been boric acid, borax or inorganic borates. The use of boric acid as a source of borate ions has two disadvantages under high temperature operations. If the sole cross linking agent is borate ions obtained from boric acid, then the viscosity of the fluid starts to degrade as soon as elevated temperatures are reached (e.g. 100° F. and higher) resulting in a system which is very sensitive to any breaker addition.

In order to overcome this problem, different approaches have been developed. For example, Mondshine teaches the use of a sparingly soluble borate. U.S. Pat. No. 5,165,479 [Harris et al], discloses a fracturing fluid with delayed cross linking action wherein the fluid includes a cross linking agent comprising a source of borate ions and a delayed cross linker comprising a source of Ti [+4] or Zr [+4] ions. The delayed cross-linking provides a means by which the viscosity may be further enhanced at elevated temperatures. U.S. Pat. No. 5,217,632 [Sharif] discloses a process for preparing boron zirconium chelate solutions that are stable and useful as a fracturing fluid for treating underground oil and gas bearing strata.

In order to address the thermal instability of borate complexed thickener systems at higher temperatures, these patents teach the use of additives [which increase the complexity of the thickener system] or utilize a form of borate ions which are obtained from alkaline earth metal borates, alkali metal alkaline earth metal borates and mixtures thereof which are sparingly soluble and thus complicate the preparation of the fracturing fluid.

SUMMARY OF THE INVENTION

It has surprisingly been determined that the use of borate esters are beneficial in the production of formation treating fluids (e.g. fracturing fluids) and, preferably, high temperature formation treating fluids. Borate esters will increase the viscosity of a fracturing fluid upon addition (i.e. the initial or start up viscosity). However, several minutes are required from the addition of a borate ester to result in the solution achieving its final or ultimate viscosity. The initial viscosity is sufficiently high to provide good proppant transport characteristics to the fluid yet sufficiently low to permit the fluid to be pumped into a borehole. Further, the final viscosity is stable at elevated temperatures (up to 130° C./265° F. or more) once the fluid is in the borehole and has achieved its final viscosity.

These fracturing fluids are particularly advantageous in high temperature applications. In particular, as the temperature of the fracturing fluid increases, e.g. over 40–60° C. (100–140° F.), the rate of cross-linking increases thus significantly accelerating the rate of viscosity increase. Further, once the maximum temperature of the fracturing fluid is reached in a borehole, the viscosity is stable.

In accordance with one embodiment of the instant invention, there is provided formation treating fluid comprising:
  (a) a borate ester;
  (b) a liquid carrier; and,
  (c) a cross linkable polymer wherein the formation treating fluid has an alkaline pH when the formation treating fluid is positioned in a formation.

In one embodiment, the formation treating fluid further comprises a proppant (e.g. sand).

In another embodiment, the formation treating fluid further comprises a pH adjustment agent to raise the pH of the formation treating fluid to about 8 or higher. Preferably, the pH is sufficiently low to prevent significant hydrolysis of the cross linkable polymer. Preferably, the pH adjustment agent is an alkali or alkaline salt. The alkali or alkaline salt is preferably an hydroxide, a carbonate, a bicarbonate a silicate and mixtures thereof.

In another embodiment, the formation treating fluid has a pH from about 8 to about 13.

In another embodiment, the formation treating fluid has a pH from about 9.5 to about 11.5.

In another embodiment, the borate ester is one or more of a triester and a cyclic ester.

In another embodiment, the borate ester comprises from about 0.001 to about 1 vol. % of the formation treating fluid, preferably from about 0.005 to about 0.5 vol. % of the formation treating fluid and more preferably from about 0.01 to about 0.1 vol. % of the formation treating fluid.

In another embodiment, the liquid carrier comprises water, methanol or a mixture thereof.

In accordance with the instant invention, there is also provided a method of fracturing a formation comprising:
(a) providing an alkaline formation treating fluid comprising a borate ester, a liquid carrier and, a cross linkable polymer; and,
(b) pumping the formation treating fluid into the formation.

In one embodiment, the method further comprises adding a pH adjusting agent to increase the pH of the formation treating fluid to about 8 or higher prior to pumping the formation treating fluid into the formation.

In another embodiment the method further comprises selecting the liquid carrier from the group consisting of water, methanol and mixtures thereof.

In another embodiment, the method further comprises selecting one or more of a triester and a cyclic ester as the borate ester.

In another embodiment, the method further comprises adjusting the pH of the formation treating fluid to be sufficiently low to prevent significant hydrolysis of the cross linkable polymer.

In another embodiment, the method further comprises adjusting the pH of the formation treating fluid to be less than 13, and preferably from about 9.5 to about 11.5.

In accordance with the instant invention, there is also provided the use of a borate ester in a formation treating fluid as a cross linking agent for a cross linkable polymer.

DETAILED DESCRIPTION OF THE INVENTION

In accordance with the instant invention, a formation treating fluid comprises at least one borate ester, a liquid carrier and a cross linkable polymer. The liquid carrier is a fluid that forms the base of the fracturing fluid and provides the medium for the borate ester and the cross linkable polymer to react to form a cross linked polymer. The cross linked polymer thickens the liquid carrier so that the liquid carrier may transport a proppant to the formation to be treated.

As used herein, the term "formation treating fluid" refers to a fluid which is used in pressure treating a formation such as gravel packing, hydraulic fracturing and fracpacking operations. Hydraulic fracturing operations may be conducted by pumping a fluid into a borehole in the formation and subjecting the fluid (and therefore the formation) to elevated pressures. The following description is provided in conjunction with the use of the fluid as a fracturing fluid. However, it will be appreciated that the fluid may be used in any formation treating operation known in the art that requires a thickened fluid.

The liquid carrier may be any liquid that can be thickened by a borate cross linked polymer. In generally, the liquid carrier may be any liquid in which the polymer, once added to the liquid, may be hydrated. The liquid carrier is preferably an aqueous based solution or an alcohol. The aqueous based solution is preferably water. The alcohol is preferably methanol. Typically, the preferred liquid carrier is water. However, in some applications, such as gas wells, the formation to be fractured may be undersaturated. In order to prevent swelling of the formation, a non-hydrating fracturing fluid is utilized. In such applications, an alcohol, may be used as the liquid carrier. If an alcohol is used as the liquid carrier, then an agent such as fumaric acid may be added to aid in the hydration of the polymer.

The cross linkable polymer may be any polymer that may be cross linked by reaction of the polymer with borate ions. In general, any polymer which is soluble in the liquid carrier so as to produce a stable gel may be utilized. If the liquid carrier is water, then the cross linkable polymer is preferably guar or a guar derivative (such as hydroxypropyl guar, carboxymethylhydroxypropyl guar), or a cellulose derivative (such as carboxymethylhydroxyethyl methyl cellulose), a polyvinyl alcohol or mixtures thereof. Preferably, the polymer is one or more of guar or guar derivatives. If the liquid carrier is methanol, then the cross linkable polymer may be one or more of guar derivatives and cellulose derivatives. Preferably, the polymer is a guar derivative. More preferably, the polymer a hydroxypropyl guar derivative.

The cross linkable polymer may be added at a rate to provide the desired viscosity in the thickened fracturing fluid. The cross linkable polymer may be added at a rate of about 1 to about 10 (8 to 80) preferably from about 2 to about 8 (16 to 65) and, most preferably, from about 2.5 to about 6 (20 to 50) Kg/m$^3$ (lbs/1,000 gallons) of the fracturing fluid.

In accordance with the instant invention, the borate ester acts as a cross linking agent in the fracturing fluid. Any source of borate ester may be utilized. For example, the borate ester may be formed in situ. Preferably, the borate ester is preformed (e.g. it may be purchased from a third party supplier and added preformed to the liquid carrier). Without being limited by theory, the borate ester produces borate ions when introduced to the liquid carrier. For example, if the liquid carrier is water, then the borate ester hydrolyzes. The borate ions, which are so liberated, combine with hydroxy and/or carboxyl groups in the polymer, such as by hydrogen bonding, so as to cross link the polymer. One or more borate esters may be utilized in a fracturing fluid in accordance to the instant invention. The borate ester may be one or more of a triester (such as trimethyl borate, triisopropyl borate, triethyl borate) and a cyclic ester (such as trimethoxy boroxin).

An advantage of the use of triesters and cyclic esters is that the cross linking efficiency of these esters is greater as compared to boric acid. Thus, improved proppant support will be provided due to the increased density of cross linking which is available. Alternately, to obtain the same degree of cross linking (and therefore the same degree of viscosity) a reduced amount of borate ester may be utilized on a molar basis.

Preferably, the fracturing fluid comprises from about 0.001 to about 1, more preferably from about 0.005 to about 0.5 and, most preferably from about 0.01 to about 0.1 vol. % of borate ester, based upon the total volume of the fracturing fluid without any proppant.

The pH of the fracturing fluid is basic. If the pH of the fracturing fluid is too high, then the cross linkable polymer will tend to hydrolize. This reduces the molecular weight of the polymer and, accordingly, the fracturing fluid will have a reduced viscosity. Preferably, the pH is maintained below the level at which significant hydrolysis of the cross linkable polymer occurs. The upper limit of the pH range will vary depending upon several factors including the degree to which hydrolysis of the cross linkable polymer is tolerable in the fracturing fluid and the actual cross linkable polymer, which is utilized. Preferably, the pH is maintained at about 13 or less, more preferably at about 12 or less and, most preferably at about 11.5 or less.

If the pH of the fracturing fluid is too low, then a stable viscosity will not be obtained. Without being limited by theory, it is understood that if the pH is too low, then the borate ion will not form the requisite hydrogen bond with the cross linkable polymer so as to cross link the polymer. At a pH of about 8 or higher, preferably about 8.5 or higher, the requisite cross linked complex is formed. The lower pH limit is preferably about 9.5 or higher. Accordingly, an acceptable pH range may be obtained by combining any of the upper and lower pH levels set out previously. Preferably, the pH is from about 8 to about 13, more preferably from about 8.5 to about 12 and most preferably from about 8.5 to about 11.5.

In order for the formation treating fluid to have the requisite alkaline viscosity, a pH adjustment agent may be required. However, this may not be necessary. For example, if the water is highly alkaline, or if the borate ester is provided in an alkaline solution, then, upon combining the liquid carrier, the polymer and the borate ester, a fluid having a sufficiently alkaline pH may be obtained. If the pH is outside the requisite range, then a pH adjustment agent may be added. The pH adjustment agent may be any of those known in the art. For example, the pH adjustment agent may be an alkali or alkaline salt such as any hydroxide (such as sodium, potassium, magnesium and/or ammonium hydroxide), any carbonate or bicarbonate (such as sodium, potassium and/or ammonium carbonate or bicarbonate) and silicates (such as sodium and/or potassium silicates). Preferably, the pH adjustment agent is salt an alkali or alkaline and, more preferably, the pH adjustment agent is an hydroxide, a carbonate, a bicarbonate and/or a silicate. The amount that is added will vary depending on the pH of the fluid without the pH adjustment agent and the desired pH range. A plurality of salts may be provided so as to act as a buffer in the fluid.

The fracturing fluid may include any other additive known in the art. In particular, the fracturing fluid may include a proppant (preferably sand). In addition, the fracturing fluid may include such typical additives as biocides, surfactants, breakers and salts or cationic materials used to prevent formation damage.

Subsequent to a fracturing operation, the viscosity of the fracturing fluid may be reduced and the fracturing fluid recovered from a borehole by any means known in the art. In particular, oxidizers and enzymes as well as a pH lowering agent (to reduce the pH of the solution to less than about 8) may be used as breakers.

An advantage of the instant invention is that the liquid carrier, the polymer and the borate ester may be combined in any order and the pH adjusted to greater than about 8.0 at any time during the combination of the constituent elements. Accordingly, the fluid is well suited for being manufactured on a continuous basis as it is pumped into a borehole. For example, the liquid carrier may be provided (such as in a storage tank). The liquid carrier may be combined with the cross linkable polymer in the storage tank. For example, if the cross linkable polymer is guar, the guar may be added to an aqueous liquid carrier so as to hydrate the guar prior to the preparation of the fracturing fluid. Alternately, a hydrated guar may be added as the liquid carrier is pumped towards a borehole. As the liquid carrier is pumped towards the borehole, the borate ester (the polymer if not previously added) and the optional proppant and other standard industry additives may be added. Preferably, the borate ester is added upstream of the proppant so that the viscosity of the liquid carrier has increased by the time the proppant is introduced into the fracturing fluid. The completed fracturing fluid is then introduced into the borehole.

Preferably, the borate ester is added to the fracturing fluid shortly before or as the fracturing fluid is pumped into a borehole so that the viscosity increase is limited at the time the fluid enters the formation.

The following are non-limiting examples showing a preferred embodiment of the instant invention. It will be appreciated by one skilled in the art that various additions and modifications may be made to the formation treating fluid disclosed herein and each is within the scope of this invention.

EXAMPLE 1

A gel was prepared with 4.5 kg/m³ (40 lbs/1,000 gallons) loading of guar (WG-15™ which is available from BJ Services Company Canada) in fresh water. (GW-4™, which is a guar that is available from BJ Services Company, U.S.A., could also be used). After hydration of the guar, the pH was adjusted to the range of 11.7–11.8 with caustic or a suitable buffer such as Buffer 16X™ (which is a silicate buffer and is available from BJ Services Company Canada). (Buffer-6L™, which is a silicate buffer that is available from BJ Services Company, U.S.A., could also be used). 250 ml of the hydrated gel was then placed in a Waring™ blender and the speed of the blender increased until a vortex was formed from the top of the blender blade nut. A gel stabilizer (GS-1A™ which is an anti-oxidant and is available from BJ Services Company Canada and B.J. Services Company, U.S.A.) was added at a loading rate of 1.5 kg/m³ (12.5 lbs/1,000 gallons). An amount of a cross linking formulation was then added to the vortex. The time taken for the vortex to close (the "cross link time") was noted. The cross linkers that were added were trimethoxy boroxin (TMBX) in xylene, trimethyl borate (TMB) in hexane and boric acid. The results are set out in Table 1.

TABLE 1

| Crosslinker Formulation | Loading L/m³ (gallons/1,000 gallons) | Crosslinker Time (sec.) | Boron Content Kg/m³ (lbs/ 1,000 gallons) |
|---|---|---|---|
| 10% TMBX in xylene | 1 | 110 | 0.09 (0.75) |
| 10% TMBX in xylene | 2 | 65 | 0.18 (1.5) |
| 10% TMBX in xylene | 3 | 50 | 0.27 (2.25) |
| 10% TMBX in xylene | 4 | 46 | 0.36 (3.0) |
| Crosslinker Formulation | Loading L/m³ (gallons/ 1,000 gallons) | Crosslinker Time (sec.) | Boron Content Kg/m³ (lbs/ 1,000 gallons) |
| 10% TMB in Hexane | 2 | 171 | 0.14 (1.17) |
| 10% TMB in Hexane | 3 | 100 | 0.21 (1.75) |
| 10% TMB in Hexane | 4 | 80 | 0.28 (2.33) |
| 10% TMB in Hexane | 5 | 62 | 0.35 (3.0) |
| Crosslinker Formulation | Loading Kg/m³ (lbs/ 1,000 gallons) | Crosslinker Time (sec.) | Boron Content Kg/m³ (lbs/ 1,000 gallons) |
| Boric Acid in Gel | 0.15 (1.25) | Instantaneous | 0.15 (1.25) |
| Boric Acid in Gel | 0.2 (1.67) | Instantaneous | 0.20 (1.67) |
| Boric Acid in Gel | 0.25 (2) | Instantaneous | 0.25 (2) |
| Boric Acid in Gel | 0.3 (2.5) | Instantaneous | 0.30 (2.5) |

As set out in the above table, the addition of boric acid as a cross linker resulted in instantaneous closing of the vortex demonstrating that the viscosity of the fluid increased instantaneously. However, the use of borate esters required about 1 to about 3 minutes to increase the viscosity sufficiently to close the vortex. Thus, the addition of borate esters provided a slow increase in the viscosity of the fluid. Borate esters provide sufficient viscosity shortly upon addition to provide proppant transport yet have a viscosity which is sufficiently low to facilitate being pumping into a borehole.

EXAMPLE 2

Various cross linked gels were prepared as in Example 1. The cross linked gels were then loaded into the pressurized Fann™ 50 rheometer, which was preheated to a selected temperature (80° C. (176° F.), 100° C. (212° F.) and 130° C. (266° F.)). The gels were then sheared at 100 sec-1 and the viscosity monitored. The initial time (0 minutes) was when the fluid was first loaded into the rheometer after vortex closure in the blender. The results are set out in Tables 2.1, 2.2 and 2.3.

TABLE 2.1

| Viscosity, cP @ 100 sec$^{-1}$ 10% TMBX in xylene @ 2 L/m$^3$ (2 gal/1,000 gal) | Viscosity, cP @ 100 sec$^{-1}$ 10% TMB in Hexane @ 3 L/m$^3$ (3 gal/1,000 gal) | Viscosity, cP @ 100 sec$^{-1}$ Boric Acid @ 0.2 kg/m$^3$ (1.7 lbs/1,000 gal) | Time (min.) | Temperature (° C./(° F.)) of Fluid |
|---|---|---|---|---|
| 180 | 100 | 1120 | 0 | 22 (72) |
| 310 | 200 | 1060 | 1 | 29 (84) |
| 840 | 640 | 1000 | 2 | 40 (104) |
| 540 | 480 | 920 | 3 | 53 (127) |
| 1100 | 1040 | 860 | 4 | 62 (144) |
| 1020 | 990 | 840 | 5 | 72 (162) |
| 990 | 980 | 810 | 10 | 80 (176) |
| 970 | 970 | 780 | 15 | 80 (176) |
| 960 | 970 | 770 | 20 | 80 (176) |
| 960 | 970 | 760 | 30 | 80 (176) |
| 960 | 970 | 760 | 40 | 80 (176) |
| 960 | 970 | 760 | 50 | 80 (176) |
| 960 | 970 | 760 | 60 | 80 (176) |
| 960 | 970 | 750 | 120 | 80 (176) |

TABLE 2.2

| Viscosity @ 100 sec$^{-1}$ 10% TMBX in xylene @ 2.5 L/m$^3$ (2.5 gal/1,000 gal) | Viscosity @ 100 sec$^{-1}$ 10% TMB in Hexane @ 4.0 L/m$^3$ (4 gal/1,000 gal) | Viscosity @ 100 sec$^{-1}$ Boric Acid @ 0.25 kg/m$^3$ (2 lbs/1,000 gal) | Time (min.) | Temperature (° C./(° F.)) of Fluid |
|---|---|---|---|---|
| 220 | 160 | 1160 | 0 | 22 (72) |
| 380 | 240 | 1080 | 1 | 30 (86) |
| 880 | 710 | 940 | 2 | 43 (109) |
| 570 | 520 | 860 | 3 | 57 (135) |
| 1040 | 940 | 810 | 4 | 68 (155) |
| 1000 | 900 | 740 | 5 | 79 (174) |
| 940 | 880 | 460 | 10 | 94 (201) |
| 900 | 870 | 370 | 15 | 100 (212) |
| 880 | 860 | 320 | 20 | 100 (212) |
| 880 | 860 | 300 | 30 | 100 (212) |
| 880 | 860 | 290 | 40 | 100 (212) |
| 880 | 860 | 280 | 50 | 100 (212) |
| 880 | 860 | 270 | 60 | 100 (212) |
| 880 | 860 | 200 | 120 | 100 (212) |

TABLE 2.3

| Viscosity @ 100 sec$^{-1}$ 10% TMBX in xylene @ 3.0 L/m$^3$ (3.0 gal/1,000 gal) | Viscosity @ 100 sec$^{-1}$ 10% TMB in Hexane @ 5.0 L/m$^3$ (5.0 gal/1,000 gal) | Viscosity @ 100 sec$^{-1}$ Boric Acid @ 0.3 kg/m$^3$ (2.5 lbs/1,000 gal) | Time (min.) | Temperature (° C./(° F.)) of Fluid |
|---|---|---|---|---|
| 260 | 200 | 1160 | 0 | 22 (72) |
| 410 | 310 | 1080 | 1 | 31 (88) |
| 880 | 760 | 940 | 2 | 46 (115) |
| 600 | 560 | 860 | 3 | 62 (144) |
| 910 | 880 | 810 | 4 | 74 (165) |
| 720 | 700 | 740 | 5 | 88 (190) |
| 540 | 520 | 460 | 10 | 121 (250) |
| 520 | 500 | 370 | 15 | 130 (266) |
| 500 | 490 | 320 | 20 | 130 (266) |
| 500 | 480 | 290 | 30 | 130 (266) |
| 500 | 480 | 260 | 40 | 130 (266) |
| 500 | 480 | 240 | 50 | 130 (266) |
| 500 | 480 | 210 | 60 | 130 (266) |
| 500 | 480 | 40 | 120 | 130 (266) |

As shown in Tables 2.1 to 2.3, even after vortex closure, the viscosity of fluids made in accordance with the instant invention is between 100–400 cP which is low enough to minimize friction and high enough to provide proppant transport characteristics. As the fluid heats up to over 40–60° C. (100–140° F.), the viscosity increases due to cross linking. Once the fluid reaches the maximum temperature, the viscosity is stable.

In contrast, the Tables also demonstrate the results using boric acid in a non-delayed system using conventional technology. As set out in Tables 2.1–2.3, the initial viscosity was between 1100–1200 cP. Thus, the initial set up viscosity was substantially higher and would require substantial additional horsepower to pump the fluid into a borehole. Further, while the ultimate viscosity was relatively stable at 80° C. (176° F.) (about 750 cP as shown in Table 2.1), the viscosity decreased at elevated temperatures. For example, at 100° C. (212° F.), the viscosity decreased to about 200 cP (Table 2.2) while at even higher temperatures, 130° C. (266° F.), the viscosity decreased below that level (Table 2.3). Accordingly, the non-delayed boric acid based system commences degradation as soon as an elevated temperature is reached.

EXAMPLE 3

This Example demonstrates a gel prepared utilizing methanol as the liquid carrier. The cross linkable polymer was a methanol soluble guar (hydroxypropyl guar), which is available from BJ Services Company Canada and B.J. Services Company, U.S.A., under the trade mark GM-55. The cross linkable polymer was added to technical grade 100% methanol at various loading rates. 0.08 kg/m$^3$ (0.67 lbs/1,000 gallons) of fumaric acid added to aid in the hydration of the polymer in the non-aqueous alcohol. After hydration of the polymer, a carbonate buffer (Buffer 15™ available from BJ Services Company Canada) was added at various loading rates and the cross linking agent was then added at various loadings. (BF-9L™, which is a carbonate buffer that is available from BJ Services Company, U.S.A., could also be used). The cross linked gels were then loaded into a pressurized Brookfield™ HPHT rheometer which was preheated to various preset temperatures and sheared at 100 sec-1. The viscosity and temperature of the gel was monitored. The results are set out in tables 3.1–3.8.

TABLE 3.1

The polymer was added at a rate of 5 Kg/m$^3$ (42 lbs/1,000 gallons) and Buffer 15 was added at a rate of 2.0 L/m$^3$ (2 gallons/1,000 gallons). The cross linking agent was triethyl borate which was provided in a solution comprising 10 vol. % triethyl borate in hexane. The cross linking agent was loaded at a rate of 2.0 L/m$^3$ (2 gallons/1,000 gallons).

| Time (min) | Temperature (° C./(° F.)) | Viscosity, cP at 100 sec − 1 |
|---|---|---|
| 0 | 22 (72) | 56 |
| 5 | 41 (106) | 191 |
| 10 | 47 (117) | 246 |
| 15 | 50 (122) | 263 |
| 30 | 50 (122) | 260 |
| 60 | 60 (140) | 247 |
| 75 | 60 (140) | 251 |
| 90 | 65 (149) | 225 |
| 105 | 70 (158) | 222 |
| 120 | 70 (158) | 300 |
| 135 | 70 (158) | 500 |
| 150 | 70 (158) | 462 |
| 165 | 70 (158) | 351 |
| 180 | 70 (158) | 365 |
| 210 | 80 (176) | 332 |
| 240 | 85 (185) | 276 |
| 270 | 90 (194) | 233 |
| 300 | 95 (203) | 167 |
| 330 | 100 (212) | 133 |
| 360 | 120 (248) | 55 |

TABLE 3.2

The polymer was added at a rate of 5 Kg/m$^3$ (42 lbs/1,000 gallonsft$^3$) and Buffer 15 was added at a rate of 2.0 L/m$^3$ (2 gallons/1000 gallons). The cross linking agent was triethyl borate which was provided in a solution comprising 10 vol. % triethyl borate in hexane. The cross linking agent was loaded at a rate of 3.0 L/m$^3$ (3 gallons/1,000 gallons).

| Time (min) | Temperature (° C./(° F.)) | Viscosity, cP at 100 sec − 1 |
|---|---|---|
| 0 | 22 (72) | 81 |
| 5 | 41 (106) | 245 |
| 10 | 47 (117) | 292 |
| 15 | 50 (122) | 293 |
| 30 | 50 (122) | 293 |
| 60 | 50 (122) | 276 |
| 75 | 50 (122) | 252 |
| 90 | 55 (131) | 222 |
| 105 | 60 (140) | 224 |
| 120 | 70 (158) | 230 |
| 135 | 70 (158) | 270 |
| 150 | 70 (158) | 286 |
| 165 | 75 (167) | 275 |
| 180 | 80 (176) | 257 |
| 210 | 80 (176) | 240 |
| 240 | 90 (194) | 169 |
| 270 | 90 (194) | 156 |
| 300 | 100 (212) | 71 |
| 330 | 110 (230) | 31 |
| 360 | 110 (230) | 15 |

TABLE 3.3

The polymer was added at a rate of 5 Kg/m$^3$ (42 lbs/1,000 gallonsft$^3$) and Buffer 15 was added at a rate of 2.0 L/m$^3$ (2 gallons/1,000 gallons). The cross linking agent was triethyl borate which was provided in a solution comprising 10 vol. % triethyl borate in hexane. The cross linking agent was loaded at a rate of 4.0 L/m$^3$ (4 gallons/1,000 gallons).

| Time (min) | Temperature (° C./(° F.)) | Viscosity, cP at 100 sec − 1 |
|---|---|---|
| 0 | 22 (72) | 374 |
| 5 | 41 (106) | 353 |
| 10 | 47 (117) | 316 |
| 15 | 50 (122) | 304 |
| 30 | 50 (122) | 285 |
| 60 | 60 (140) | 392 |
| 75 | 60 (140) | 447 |
| 90 | 65 (149) | 396 |
| 105 | 70 (158) | 330 |
| 120 | 75 (167) | 270 |
| 135 | 80 (176) | 225 |
| 150 | 80 (176) | 180 |
| 165 | 80 (176) | 165 |
| 180 | 90 (194) | 116 |
| 210 | 90 (194) | 63 |
| 240 | 90 (194) | 52 |
| 270 | 100 (212) | 25 |

TABLE 3.4

The polymer was added at a rate of 5 Kg/m$^3$ (42 lbs/1,000 gallons) and Buffer 15 was added at a rate of 2.0 L/m$^3$ (2 gallons/1,000 gallons). The cross linking agent was triethyl borate which was provided in a solution comprising 10 vol. % triethyl borate in hexane. The cross linking agent was loaded at a rate of 5.0 L/m$^3$ (5 gallons/1,000 gallons).

| Time (min) | Temperature (° C./(° F.)) | Viscosity, cP at 100 sec − 1 |
|---|---|---|
| 0 | 22 (72) | 560 |
| 5 | 41 (106) | 402 |
| 10 | 47 (117) | 360 |
| 15 | 50 (122) | 340 |
| 30 | 60 (140) | 507 |
| 60 | 60 (140) | 421 |
| 75 | 60 (140) | 416 |
| 90 | 65 (149) | 323 |
| 105 | 70 (158) | 287 |
| 120 | 70 (158) | 251 |
| 135 | 75 (167) | 228 |
| 150 | 80 (176) | 205 |
| 165 | 80 (176) | 145 |
| 180 | 80 (176) | 124 |
| 210 | 90 (194) | 90 |
| 240 | 90 (194) | 65 |
| 270 | 95 (203) | 56 |
| 300 | 100 (212) | 32 |

TABLE 3.5

The polymer was added at a rate of 6 Kg/m$^3$ (50 lbs/1,000 gallonsft$^3$) and Buffer 15 was added at a rate of 3.0 L/m$^3$ (3 gallons/1,000 gallons). The cross linking agent was triethyl borate which was provided in a solution comprising 10 vol. % triethyl borate in hexane. The cross linking agent was loaded at a rate of 2.0 L/m$^3$ (2 gallons/1,000 gallons).

| Time (min) | Temperature (° C./(° F.)) | Viscosity, cP at 100 sec − 1 |
|---|---|---|
| 0 | 22 (72) | — |
| 5 | 41 (106) | 82 |
| 10 | 47 (117) | 123 |
| 15 | 50 (122) | 151 |
| 30 | 50 (122) | 207 |
| 60 | 60 (140) | 240 |
| 75 | 60 (140) | 260 |

TABLE 3.5-continued

The polymer was added at a rate of 6 Kg/m³ (50 lbs/1,000 gallonsft³) and Buffer 15 was added at a rate of 3.0 L/m³ (3 gallons/1,000 gallons). The cross linking agent was triethyl borate which was provided in a solution comprising 10 vol. % triethyl borate in hexane. The cross linking agent was loaded at a rate of 2.0 L/m³ (2 gallons/1,000 gallons).

| Time (min) | Temperature (° C./(° F.)) | Viscosity, cP at 100 sec − 1 |
|---|---|---|
| 90 | 60 (140) | 260 |
| 105 | 70 (158) | 282 |
| 120 | 70 (158) | 291 |
| 135 | 80 (176) | 280 |
| 150 | 80 (176) | 291 |
| 165 | 85 (185) | 330 |
| 180 | 90 (194) | 388 |
| 210 | 95 (203) | 402 |
| 240 | 100 (212) | 350 |
| 270 | 110 (230) | 185 |
| 300 | 120 (248) | 90 |

TABLE 3.6

The polymer was added at a rate of 6 Kg/m³ (50 lbs/1,000 gallons) and Buffer 15 was added at a rate of 3.0 L/m³ (3 gallons/1,000 gallons). The cross linking agent was triethyl borate which was provided in a solution comprising 10 vol. % triethyl borate in hexane. The cross linking agent was loaded at a rate of 3.0 L/m³ (3 gallons/1,000 gallons).

| Time (min) | Temperature (° C./(° F.)) | Viscosity, cP at 100 sec − 1 |
|---|---|---|
| 0 | 22 (72) | 50 |
| 5 | 41 (106) | 94 |
| 10 | 47 (117) | 203 |
| 15 | 50 (122) | 271 |
| 30 | 50 (122) | 337 |
| 60 | 60 (140) | 331 |
| 75 | 60 (140) | 337 |
| 90 | 70 (158) | 275 |
| 105 | 70 (158) | 275 |
| 120 | 80 (176) | 272 |
| 135 | 80 (176) | 361 |
| 150 | 80 (176) | 433 |
| 165 | 80 (176) | 458 |
| 180 | 85 (185) | 415 |
| 210 | 90 (194) | 385 |
| 240 | 90 (194) | 360 |
| 270 | 100 (212) | 251 |
| 300 | 105 (221) | 165 |
| 330 | 110 (230) | 124 |
| 360 | 120 (248) | 34 |

TABLE 3.7

The polymer was added at a rate of 6 Kg/m³ (50 lbs/1,000 gallons) and Buffer 15 was added at a rate of 3.0 L/m³ (3 gallons/1,000 gallons). The cross linking agent was triethyl borate which was provided in a solution comprising 10 vol. % triethyl borate in hexane. The cross linking agent was loaded at a rate of 4.0 L/m³ (4 gallons/1,000 gallons).

| Time (min) | Temperature (° C./(° F.)) | Viscosity, cP at 100 sec − 1 |
|---|---|---|
| 0 | 22 (72) | 51 |
| 5 | 41 (106) | 192 |
| 10 | 47 (117) | 317 |
| 15 | 50 (122) | 364 |
| 30 | 50 (122) | 394 |
| 60 | 60 (140) | 306 |
| 75 | 60 (140) | 294 |
| 90 | 70 (158) | 203 |
| 105 | 70 (158) | 192 |
| 150 | 80 (176) | 291 |
| 165 | 85 (185) | 330 |
| 180 | 90 (194) | 388 |
| 210 | 95 (203) | 402 |
| 240 | 100 (212) | 350 |
| 270 | 110 (230) | 185 |
| 300 | 120 (248) | 90 |

TABLE 3.8

The polymer was added at a rate of 5 Kg/m³ (42 lbs/1,000 gallons) and Buffer 15 was added at a rate of 2.0 L/m³ (2 gallons/1,000 gallons). The cross linking agent was triisopropyl borate which was provided in a solution comprising 10 vol. % triisopropyl borate in hexane. The cross linking agent was loaded at a rate of 2.0 L/m³ (2 gallons/1,000 gallons).

| Time (min) | Temperature (° C./(° F.)) | Viscosity, cP at 100 sec − 1 |
|---|---|---|
| 0 | 22 (72) | 27 |
| 5 | 41 (106) | 76 |
| 10 | 47 (117) | 149 |
| 15 | 50 (122) | 181 |
| 30 | 50 (122) | 194 |
| 60 | 60 (140) | 192 |
| 75 | 60 (140) | 182 |
| 90 | 70 (158) | 158 |
| 105 | 70 (158) | 157 |
| 120 | 80 (176) | 147 |
| 135 | 80 (176) | 150 |
| 150 | 80 (176) | 143 |
| 165 | 90 (194) | 126 |
| 180 | 90 (194) | 103 |
| 210 | 100 (212) | 84 |
| 240 | 110 (230) | 63 |
| 270 | 120 (248) | 43 |

The invention claimed is:

1. A method of fracturing a formation comprising:
   a) providing a first fluid comprising a liquid carrier and a cross linkable polymer;
   b) combining a preformed borate ester present in an organic solvent to the first fluid to form a formation treating fluid; and,
   c) pumping the formation treating fluid into the formation.

2. The method as claimed in claim 1 further comprising adding a pH adjusting agent to increase the pH of the formation treating fluid to about 8 or higher prior to pumping the formation treating fluid into the formation.

3. The method as claimed in claim 1 further comprising selecting the liquid carrier from the group consisting of water, methanol and mixtures thereof.

4. The method as claimed in claim 1 further comprising selecting one or more from the group consisting of a triester and a cyclic ester as the borate ester.

5. The method as claimed in claim 1 further comprising adjusting the pH of the formation treating fluid to be less than about 13.

6. The method as claimed in claim 1 further comprising adjusting the pH of the formation treating fluid to be from about 9.5 to about 11.5.

7. The method as claimed in claim 1 wherein the cross linkable polyer comprises guar, a guar derivative, a cellulose derivative or mixtures thereof thereof.

8. The method as claimed in claim 1 wherein the formation treating fluid hasa pH from about 8 to about 13.

9. The method as claimed in claim 4 further comprising selecting a cyclic organic compound as the organic solvent.

10. The method of claim 1, further comprising selecting the preformed borate ester from the group consisting of a triester, a cyclic ester and mixtures thereof and combining the preformed borate ester with a hydrated cross linkable polymer, as the cross linkable polymer, to prepare the formation treating fluid.

* * * * *